United States Patent [19]

Elmendorf et al.

[11] 3,936,551
[45] Feb. 3, 1976

[54] FLEXIBLE WOOD FLOOR COVERING

[76] Inventors: Armin Elmendorf, 56 Granada Court, Portola Valley, Calif. 94303; Roland Etzold, 487A Thompson Ave., Mountain View, Calif. 94043

[22] Filed: Jan. 30, 1974

[21] Appl. No.: 438,087

[52] U.S. Cl. .................. 428/50; 52/309; 156/295; 428/106; 428/541
[51] Int. Cl.² ........................................... B32B 3/10
[58] Field of Search ...... 161/36, 145, 162; 156/295, 156/304, 311; 52/309

[56] References Cited
UNITED STATES PATENTS

| | | | |
|---|---|---|---|
| 3,365,850 | 1/1968 | Marino | 161/36 |
| 3,481,810 | 12/1969 | Waite | 156/304 |
| 3,521,418 | 7/1970 | Bartoloni | 161/36 |
| 3,579,410 | 5/1971 | Barrett | 161/36 |

*Primary Examiner*—William E. Schulz

[57] ABSTRACT

The invention pertains to a method of making a wood floor covering which is flexible and can be laid on concrete with a mastic using momentary pressure. Instead of the nominal ¾-inch thickness of conventional strip hardwood floors, the floor covering is only about 1/10-inch thick. The finish on the floor covering is sufficiently wear-resistant so that for the life of the flooring the wood is never subject to wear. The finish is applied in the factory as a thermoplastic resin film which extends over the wood and spans the joints between the wood blocks of which the flooring is composed. In bonding the film a cushion is placed on the film, and heat is applied to the assembly sufficiently high to soften or melt the film. The blocks are kept from spreading apart by a constraining means partly embedded in the back of the wood by pressure, and the resin is chilled under pressure until it reaches room temperature and is solidified. In a preferred form of the flooring, the finish is the sole means for tying the blocks together, and the wood surface is rough.

9 Claims, 3 Drawing Figures

FLEXIBLE WOOD FLOOR COVERING

BACKGROUND OF THE INVENTION

With the trend in the building industry in large cities toward high-rise buildings, the need arises for a hardwood floor covering which can be laid on concrete floors with an adhesive in the manner in which conventional resilient floor coverings are installed, such as vinyl tile or linoleum. Floor coverings on concrete follow the surface of the underlying concrete, which must therefore be troweled smooth. It must also be dry. To be a satisfactory floor covering, it must not be thicker than other floor coverings, hence, not thicker than 3/16-inch. A major purpose of the present invention is to produce a thin hardwood floor covering suitable for covering concrete floors in high-rise buildings.

Conventional strip flooring on concrete requires nailing strips or sleepers embedded in the concrete to which the flooring can be nailed. The flooring may also be nailed to a subflooring, such as plywood, which in turn is nailed to embedded wood members. In the form of plywood blocks, the flooring is sometimes laid on concrete with an asphaltic mastic, which yields slowly when subjected to stress.

SUMMARY OF THE INVENTION

One aim of the present invention is to produce a flexible wood floor covering which can be bonded to subflooring in a manner resembling the bonding of vinyl tile.

Another aim is to finish the floor covering with a finish that is so durable and wear-resistant that it will not wear through for the life of the floor, and need therefore never be renewed. The wood itself is never subjected to wear. It can therefore be very thin. Requirements other than wear resistance determine the minimum thickness of the wood. The finish must also be vaporproof so that the moisture content of the wood does not change appreciably after installation.

Other objects of this invention will become apparent as the following specification progresses, reference being had to the accompanying drawing to illustrate the invention.

The product of this invention, denoted by the numeral 10, may be laid on concrete made smooth by troweling, but the resultant concrete surface is rarely perfectly flat and free of grit that causes small elevations in the floor covering. The floor covering must therefore be sufficiently thick to prevent telegraphing of grit in or on the subflooring.

The wood floor covering must be slightly flexible to follow the contour of the subflooring so that the edges of adjacent sections of the floor covering are flush and present no obstruction against which a person may trip.

Inasmuch as the wood of the present invention is never subject to wear, it can be much thinner than conventional strip flooring, which is generally fully ¾-inch thick. The wood of the present invention is only about 1/10-inch thick. The invention therefore effects great economy in the use of wood. The wood should, however, not be thinner than about 1/16-inch to prevent any solid particles such as specks of gravel in the surface of concrete from telegraphing through. Moreover, very thin wood floor coverings lack the appearance of solidity. This is the case if the wood is less than about 1/16-inch thick.

The wood of the present invention can be a single ply of veneer, or two plies of veneer bonded together, with the grain direction of each ply perpendicular to that of the other. This construction improves the dimensional stability and flexibility of the flooring. Minimum thickness of wood consistent with the requirement of non-telegraphing is also desirable so that wood strips that are slightly bent will be held to the subflooring over their entire length without springing away when freshly bonded with conventional flooring mastics. Strips that are thicker than about 3/16-inch and are also bent lengthwise are often difficult to hold down when freshly bonded, especially when the subflooring is not perfectly flat.

The product of this invention can be made in various forms, for example, as square tile, each consisting of four or more squares of smaller size, held together by the finish. The small squares, in turn, may consist of separate short blocks of wood placed edge-to-edge, and held together with no connecting means other than the finish. A herringbone pattern is another attractive floor design. The finish must be elastic and tough, and resistant to abrasion. It must be clear and follow surface roughness that may be present in unsanded or abraded wood. Abrasion removes wood fibers from the softer areas.

Figure 1:
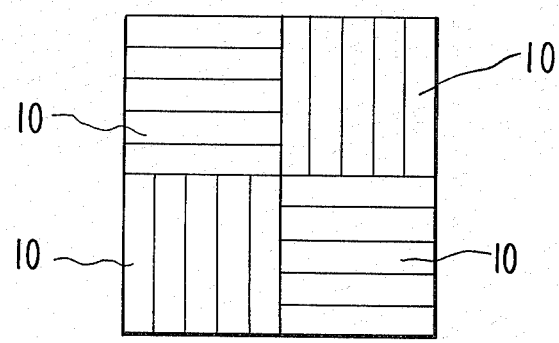
FIG. 1 is a top plan view of the wood product.

A convenient flooring unit in the form of a square that can be installed rapidly is 12 inches by 12 inches in size. Such a unit may consist of four smaller squares, each square consisting of about six or seven slats of wood. Four such squares (FIG. 1) are held together by the film finish spanning the joints between the component wood slats, as well as the joints between the squares. The slats of one square are at right angles to the slats of adjacent squares, as shown in FIG. 1.

The flooring may also be made in the form of wide, long planks that are moderately flexible and sufficiently thin so that the flexibility in the lengthwise direction is adequate for good bonding to prevent springing away from the supporting floor while the bonding adhesive is fresh. Wide, long planks may be composed of narrow wood strips held together only by the finish spanning the joints. The floor may also be produced in various parquetry patterns, each unit consisting of a number of pieces of wood connected together in a pattern only by the finish, or primarily by the finish.

The finish is applied to the wood in the form of a plastic film that is transparent, thermoplastic, and waterproof. If previously coated with an adhesive, it can be bonded to the wood while the film is being heated, and then cooled under pressure. Cushioned pressure may also be used, in which case the heat is transmitted through an elastic cushion such as a sheet of synthetic rubber. Bonding with cushion pressure improves the bond over that obtained with flat plate pressure without a cushion because the film can be firmly pressed into the depressions of a rough, unsanded wood surface and is thereby well bonded to both the elevations and valleys of rough wood. The surface is thereby completely finished and, being rough, shows that the floor is made of real wood and is not a printed wood grain substitute. Printed wood grain surfaces lack the flash associated with genuine wood.

The resultant finish revealing the roughness of the wood is less subject to noticeable scuffing than the scuffing on a smooth surface. Individual blocks stand out. The joints between blocks are accentuated.

If wood strips are loosely placed together on a smooth supporting surface with a thermoplastic film over the strips, and the softened film is subjected to cushion pressure, the outward lateral thrust of the compressed cushion or of the melted plastic that is squeezed into the joints pushes the strips apart. We have found that such spreading is prevented if a constraining means such as a wire screen or a perforated plate is used in direct contact with the wood. When subjected to pressure adequate to bond the film to the wood, such a constraining means is partly embedded in the wood, preventing adjacent strips or blocks from spreading apart. When the assembly is cooled under pressure, the blocks remain in their position.

The loose placement provides spacer for the plastic to enter part way into the joints. The plastic does not fill the joint and permits hinge-like action at each joint when it has solidified. It does not extend down far enough to prevent hinge action.

Figure 2:
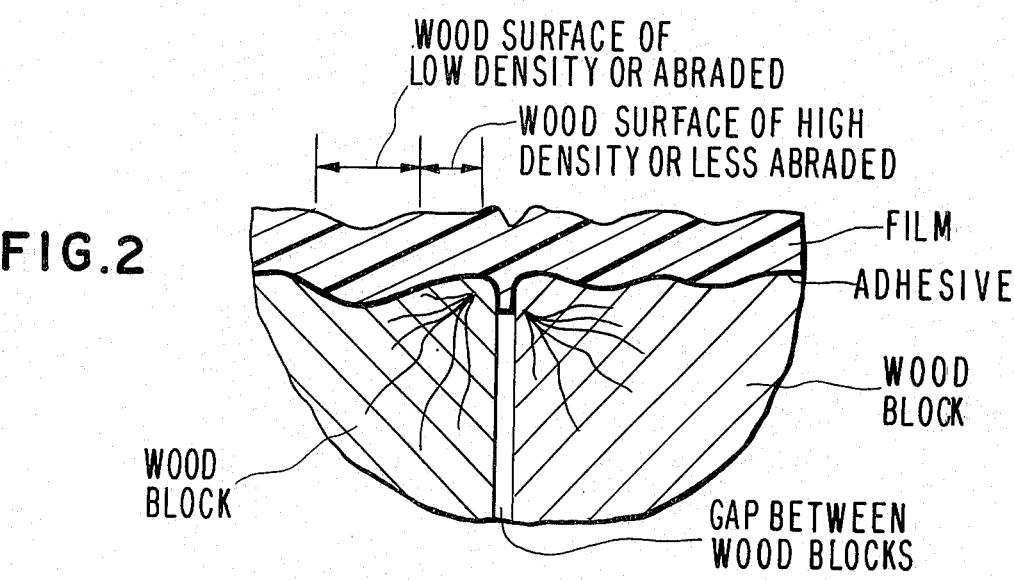
FIG. 2 is an enlarged, fragmentary, cross-sectional view of the product, showing the finish on the same.

The film finish can be a durable thermoplastic of several types appropriately plasticized, such as a vinyl or acrylic resin in a thickness of from 3 to 15 mils. This contrasts to the thickness of conventional varnish finishes which generally does not exceed 2 mils. Other films may also be used, of comparable durability, thermoplasticity, clarity and flexibility. In appearance, the finish may resemble a waxed surface and reveal the fact that it has been forced part way into the joints as shown in FIG. 2.

A suitable vinyl is one commercialized by Union Carbide Corporation, Chemicals and Plastics Division, 270 Park Avenue, New York, N.Y., under the name KDA 2216, clear. Another suitable vinyl is one known as Ultron UL 28 1015, clear, marketed by Monsanto Chemical Company, 2710 Lafayette, Santa Clara, Calif. A suitable acrylic resin is Korad C marketed by Rohm & Haas Company, 1920 South Tubeway Avenue, Los Angeles, Calif.

A synthetic rubber sheet may be used as a cushion. The smoothness of the rubber determines the smoothness of the finish on the wood. This may therefore be glossy or mat. The heat-softened film is chilled under pressure and retains the imprint of the elastic cushion.

The original thickness of the film is not changed greatly when it is heated and caused to flow under the pressure of the rubber cushion.

Figure 3:
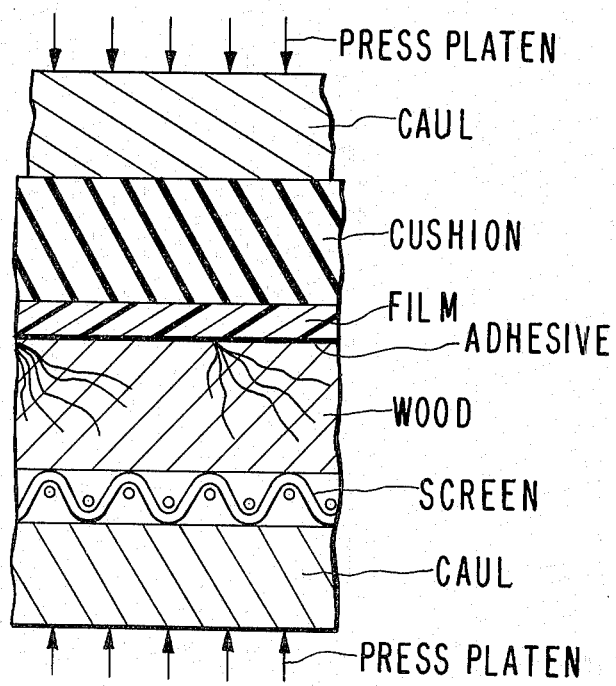
FIG. 3 is an enlarged, fragmentary, cross-sectional view of the apparatus for forming the product.

A synthetic rubber cushion about ⅛-inch thick is sufficiently thin to permit rapid transfer of heat to the film. The film is bonded to the wood with an adhesive previously applied and dried on the film or on the wood. The heated assembly, shown in FIG. 3, consisting of the caul plates, a wire screen, the wood, the film and the cushion, is transferred while hot to a cold press, where it is chilled under pressure.

A further improvement in the appearance of a flexible wood floor covering made as described may be introduced by charring the surface of rough wood blocks as by means of a hot roller at a temperature high enough to scorch the wood. Such scorching is uneven and particularly attractive in coarse textured wood such as oak. The scorched wood is protected from wear by the plastic finish.

In installing the wood floor covering made as described, an adhesive having the consistency of conventional mastics used for laying resilient floor coverings is spread on the subflooring with a notched blade. The adhesive so spread forms ridges that are subsequently flattened when the floor covering described is placed on the freshly spread adhesive and then subjected to pressure as by means of a heavy roller. As the floor covering is finished in the factory, it can be put into service immediately after installation.

We claim:

1. The method of making a flexible wood floor covering which comprises the steps of producing wood blocks from 1/16-inch to 3/16-inch thick, assembling the blocks in edge-to-edge relationship, covering the assembled blocks with a plastic resin film with an adhesive between the film and the blocks, placing an elastic cushion on the film, subjecting the assembly to heat adequate to soften the film, then cooling the assembly under pressure to cause the adhesive to bond the film to the blocks.

2. The method of claim 1 including placing a constraining means between the assembled blocks and the supporting surface.

3. The method of claim 2, in which the plastic film is a vinyl-chloride film in the thickness of from 3 to 15 mils.

4. The method of claim 1, in which the wood members are held together only by the finish.

5. The method of claim 1, in which the wood blocks comprise two layers of veneer bonded together with the grain of the plies crossing at right angles.

6. The method of claim 1, in which one surface of the wood is subjected to abrasion prior to said assembling step, thereby removing wood from the softer portions of its surface.

7. A wood floor covering which consists of an assembly of wood blocks of a thickness from 1/16-inch to 3/16-inch thick, held together edge-to-edge primarily with a thermoplastic resin finish bonded thereto by an adhesive and covering only one surface of the assembly and spanning the joints between the blocks, the thickness of the finish ranging from 3 to 15 mils.

8. The method of claim 1, in which the surface of the wood blocks has been unevenly darkened by charring prior to said assembling step.

9. The method of making a flexible wood floor covering which comprises the steps of providing wood blocks from 1/16-inch to 3/16-inch thick, assembling the blocks in edge-to-edge relationship, bonding a transparent wear-resistant film on the assembled blocks so that the film covers the blocks and forms ridges projecting downward between the blocks and revealing depressions between blocks at the surface.

* * * * *